(No Model.)
3 Sheets—Sheet 1.

A. L. HENDERSON.
APPARATUS FOR COATING GLASS OR OTHER PLATES WITH LIQUEFIED GELATINE.

No. 344,043.
Patented June 22, 1886.

(No Model.)  3 Sheets—Sheet 2.

A. L. HENDERSON.
APPARATUS FOR COATING GLASS OR OTHER PLATES WITH LIQUEFIED GELATINE.

No. 344,043.  Patented June 22, 1886.

(No Model.) 3 Sheets—Sheet 3.
A. L. HENDERSON.
APPARATUS FOR COATING GLASS OR OTHER PLATES WITH LIQUEFIED GELATINE.

No. 344,043. Patented June 22, 1886.

Witnesses
Thomas Ives.
J. M. Landon

Inventor
A. L. Henderson
per Alex Browne
Atty

UNITED STATES PATENT OFFICE.

ALEXANDER L. HENDERSON, OF LONDON, ENGLAND.

APPARATUS FOR COATING GLASS OR OTHER PLATES WITH LIQUEFIED GELATINE.

SPECIFICATION forming part of Letters Patent No. 344,043, dated June 22, 1886.

Application filed January 23, 1885. Serial No. 153,713. (No model.)

*To all whom it may concern:*

Be it known that I, ALEXANDER LEMONT HENDERSON, a subject of the Queen of Great Britain, residing at 49 King William Street, in the city of London, England, photographer, have invented a new and useful apparatus for coating glass or other plates, paper, card-board, or other material with liquefied gelatine or other fluids, particularly applicable for coating plates for use in photography; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

This invention has for its object an improved apparatus for the coating of glass or other plates, paper, card-board, or other material with liquefied gelatine or other fluids, either alone or in combination with other bodies, having primary reference to its application for coating plates for use in photography; and in order that my said invention may be understood I will now proceed to describe the same with reference to the accompanying sheet of drawings, in which—

Figure 1:
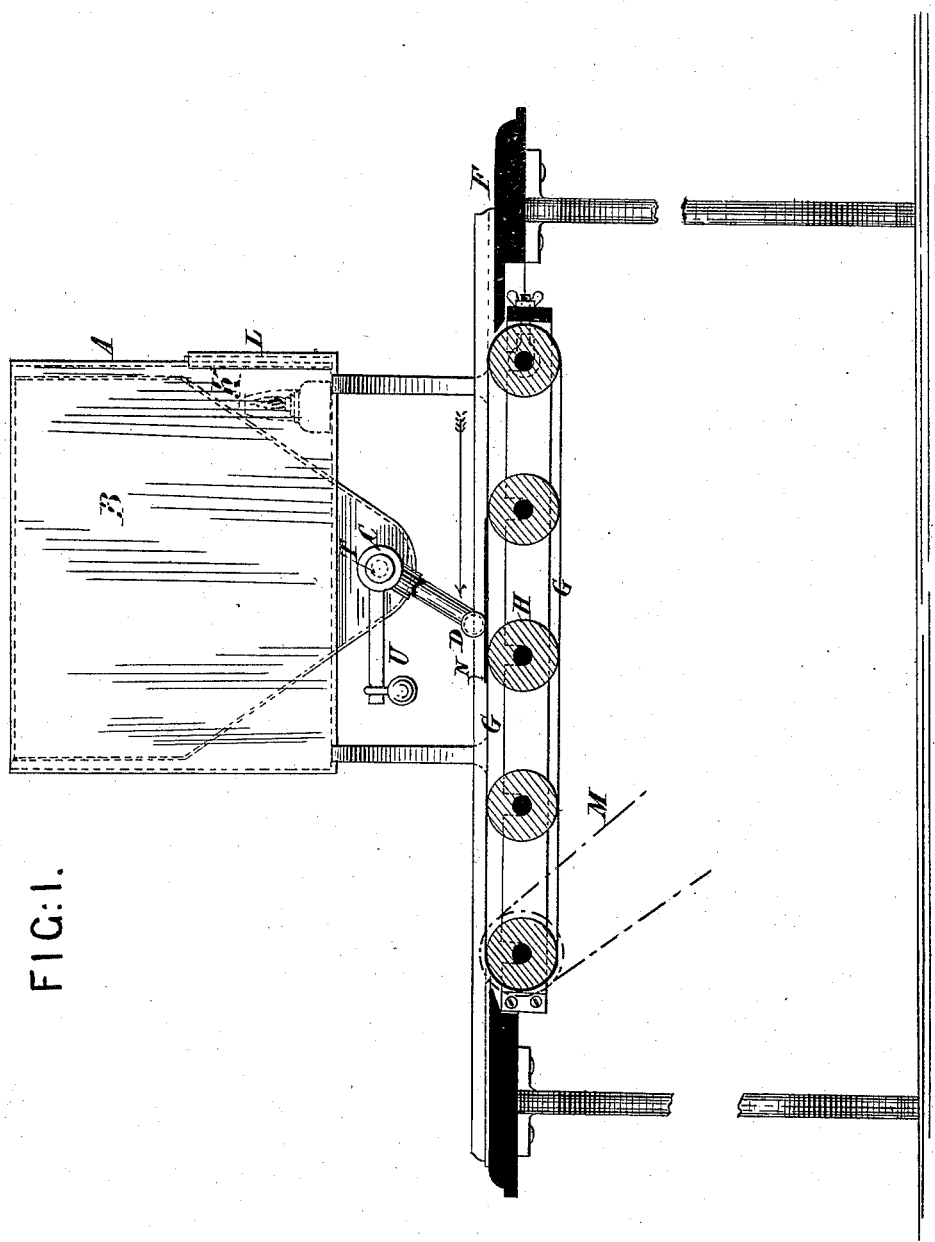
Figure 2:
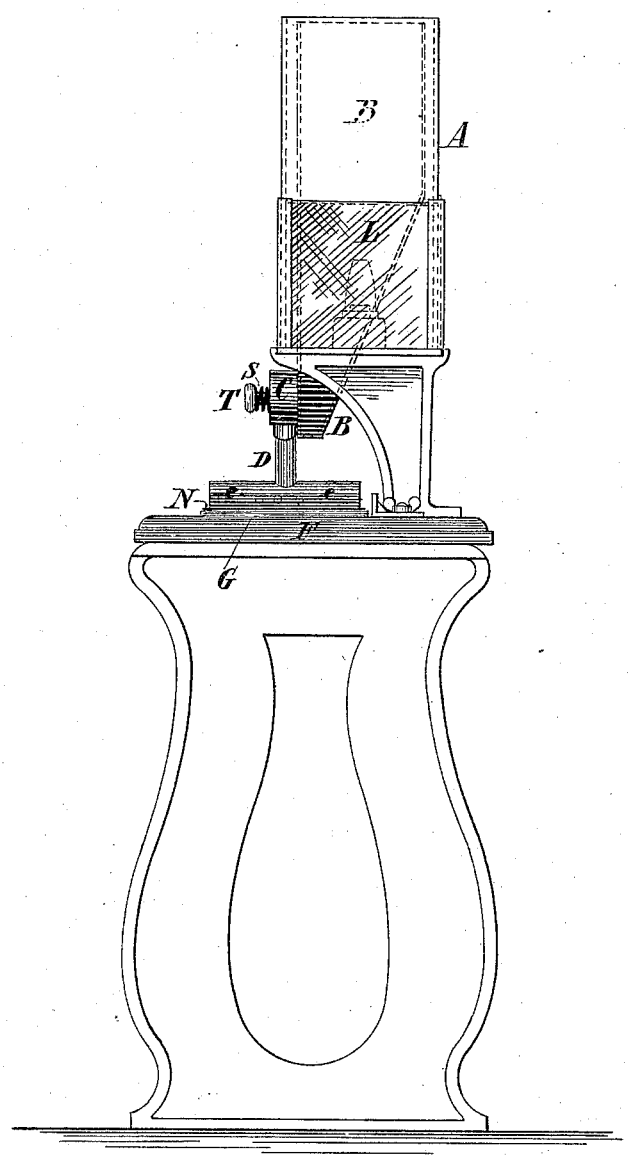
Figure 4:
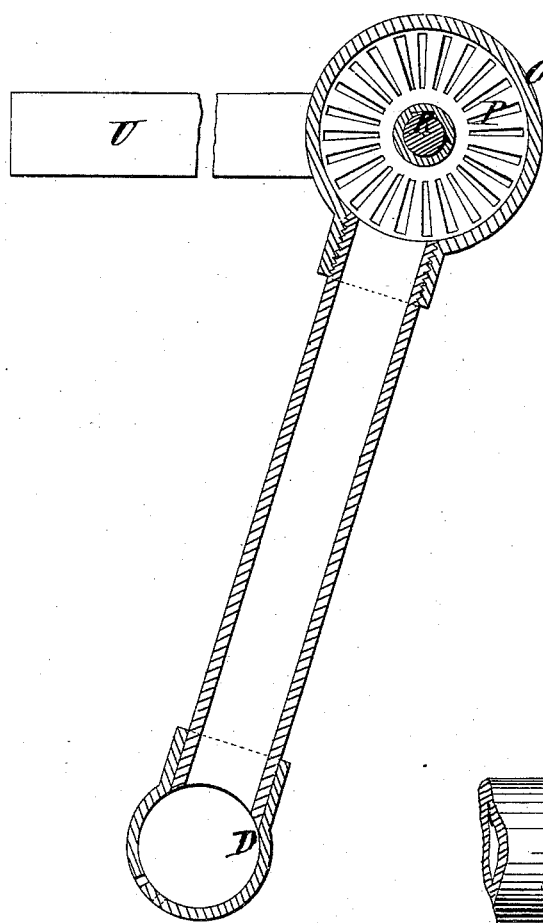
Figure 3:
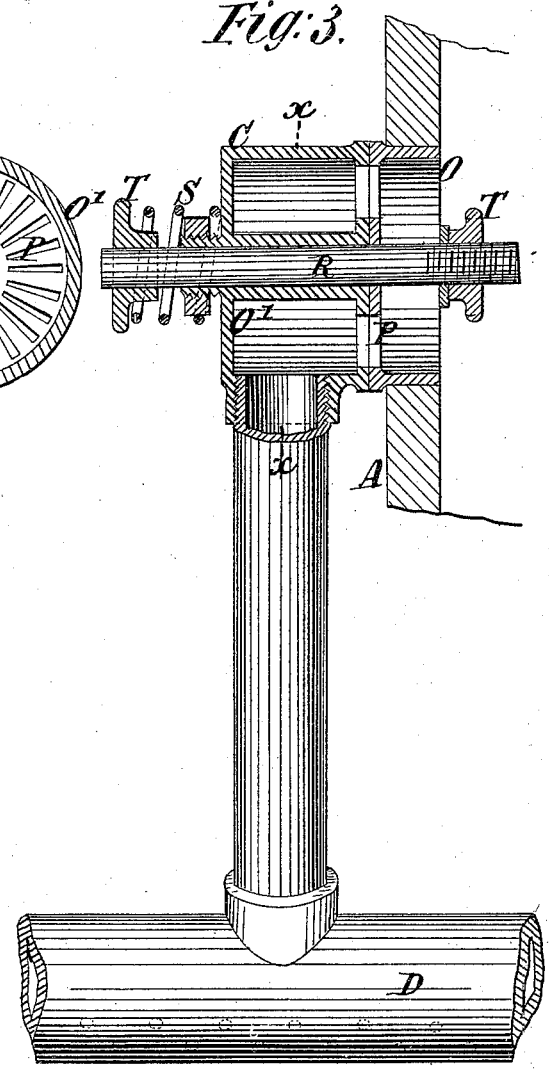

Figure 1 shows an elevation of an apparatus constructed according to my said invention. Fig. 2 is an end view thereof. Figs. 3 and 4, Sheet 2, represent detached views drawn to an enlarged scale.

The same letters are employed in all views to indicate the same parts.

A represents a hot-water bath heated by gas or other suitable means, and arranged so as to give light as well as heat, as hereinafter described.

B (shown in dotted lines) is a reservoir fitted in the bath A, to the bottom of which is connected a grating stop-cock, c, (shown enlarged in Figs. 3 and 4, and hereinafter described,) and to this is fitted the ⊥-tube D, having holes or slits e, for the exit of coating-fluid.

The bath A is fitted onto a table, F, on which works an endless band, G, made of any suitable material, and passing over a series of rollers, H, and on the axle of one of these is mounted a pulley, over which a band, M, is passed, in order to revolve the rollers by foot or by other suitable means. The bath A and reservoir B are formed underneath, as shown, in order that the space K may act as a lantern by passing glass in that part marked L.

The action is as follows: The bath being charged with water and heated, the coating material is placed in the reservoir B, and the glass plates or other material, N, to be coated are placed on the band G. The rollers H are then caused to revolve, and upon the plates N or material to be coated coming in contact with the bottom of the ⊥-tube D it will be pushed forward in the direction of the arrow, Fig. 1, and thus open the grating stop-cock c and allow the coating-fluid to pass down and out through the slits or holes e onto the material to be coated; but when the plates leave the ⊥-tube D this latter will fall back to its normal position, and thus close the stop-cock c, by which the coating material will cease to flow. I have shown a weighted lever, U, to insure the closing of the cock c.

I will now describe the stop-cock c, before referred to, and shown drawn to an enlarged scale at Figs. 3 and 4, Sheet 2. Fig. 3 is a vertical section, and Fig. 4 a section through line x x, Fig. 3.

O shows a tube having openings P, and O' shows a short tube closed at its outer end. The other end (which revolves against the tube O) has also openings P. Both the tubes O' and O are mounted on a spindle, R, and kept in forced contact by the spring S and nuts T, so that when the extra thickness of the material to be coated comes in contact with the tube D at Z it will turn the tube O' round sufficiently to open the cock and allow the fluid to pass out of the holes e; but when the plate leaves the tube it falls back sufficiently to close the openings P in the disk O', and thus stop the flow of coating-fluid, as aforesaid.

Although I have described grating-stop-cock arrangement for causing the flow of coating material to flow or cease, as may be required, I do not wish to limit myself to this particular arrangement, as I may in some cases employ other suitable means; or I may stop the flow by actuating a valve by hand when required. For instance, I may close the reservoir B air-tight, and let or force air in when I wish the material to flow; or I may have a governor similar to a steam-governor, so as to obtain a regular flow, although the speed of working the rollers may vary. It will be found preferable to work the rollers at one uniform speed.

What I do claim as my invention, and desire to secure by Letters Patent, is—

1. In an apparatus for coating glass or other plates, paper, card-board, or other material with liquefied gelatine or other fluids, particularly applicable for coating plates for use in photography, the bath A, with space K, in combination with ⊥-tube D, all substantially as and for the purposes set forth.

2. In an apparatus for coating glass or other plates, paper, card-board, or other material with liquefied gelatine or other fluids, particularly applicable for coating plates for use in photography, the stop-cock c, consisting of tube O, opening P, short tube O', also with opening P, spindle R, spring S, and nuts T, in combination with the ⊥-tube D, all substantially as and for the purposes set forth.

A. L. HENDERSON.

Witnesses:
A. BROWNE,
9 *Southampton Buildings, London, W. C., Patent Agent.*
J. T. MATTHEWS,
49 *King William Street, London, E. C., Photographer.*